UNITED STATES PATENT OFFICE.

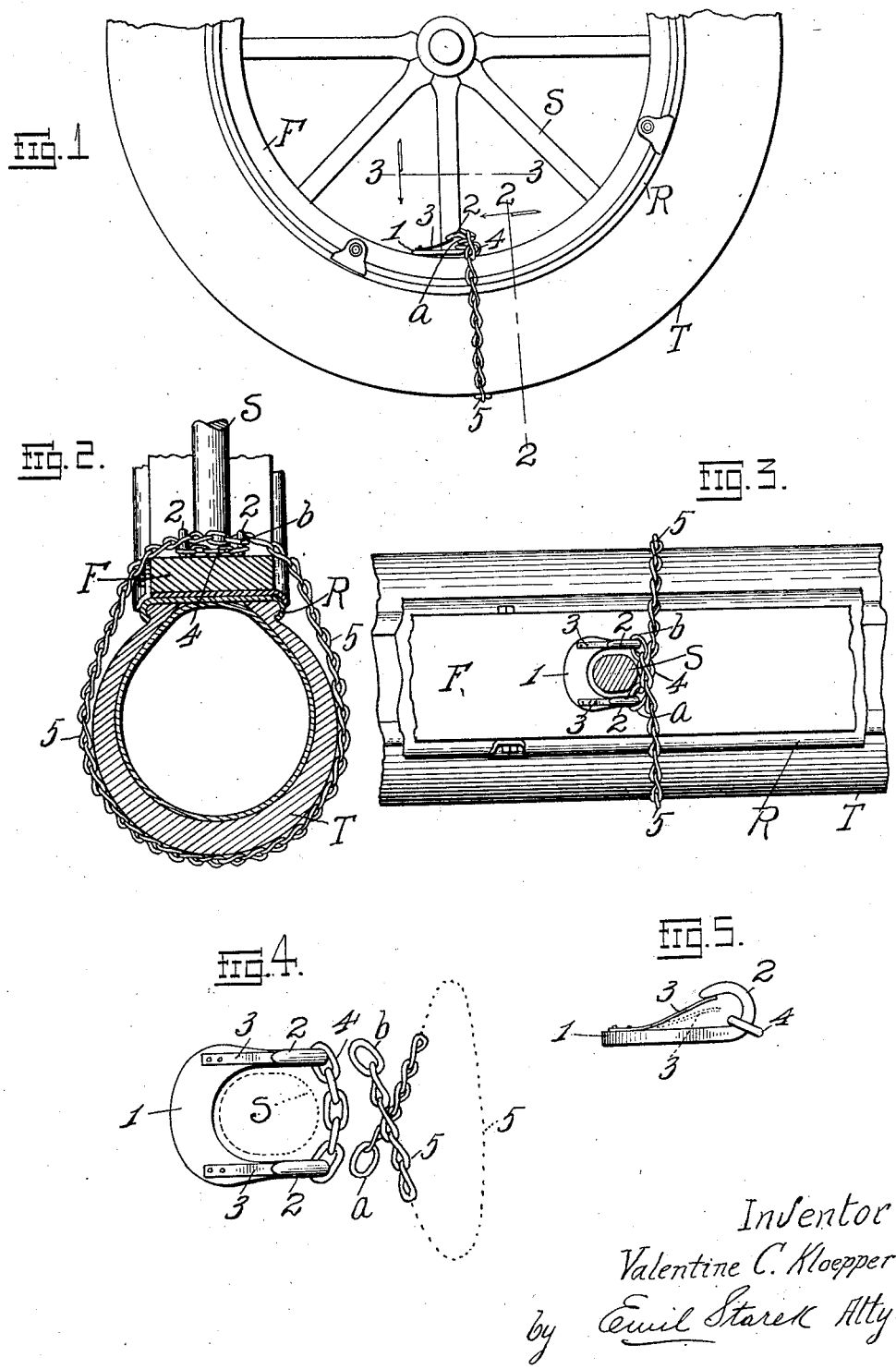

VALENTINE C. KLOEPPER, OF ST. LOUIS, MISSOURI, ASSIGNOR OF ONE-HALF TO CHARLES A. MARIEN, OF ST. LOUIS, MISSOURI.

HOOK FOR ANTISKID TIRE CHAINS.

1,406,461.      Specification of Letters Patent.      Patented Feb. 14, 1922.

Application filed December 11, 1920, Serial No. 429,951. Renewed December 30, 1921. Serial No. 525,977.

*To all whom it may concern:*

Be it known that I, VALENTINE C. KLOEPPER, a citizen of the United States, residing at St. Louis, State of Missouri, have invented certain new and useful Improvements in Hooks for Antiskid Tire Chains, of which the following is a full, clear, and exact description, reference being had to the accompanying drawings, forming a part hereof.

The present invention is directed to improvements in hooks for anti-skid tire chains, the object sought being to provide a hook that may be applied to the wheel of the vehicle without the use of bolts, thereby dispensing with the necessity of drilling holes for receiving the bolts; one that dispenses with the need of securing screws; one that may be applied to any size spoke or wheel; one that may be quickly applied to and quickly removed from the wheel; one that transfers the pulling strains directly to the spoke of the wheel; one that is cheap, durable, and simple in construction; and one possessing further and other advantages better apparent from the following detailed description in connection with the accompanying drawings in which—

Figure 1 represents a side elevation of one-half of a spoked wheel of a motor-vehicle showing my invention applied thereto; Fig. 2 is a cross-section through the tire and rim and felly of the wheel on the line 2—2 of Fig. 1; Fig. 3 is a cross-section through the spoke of the wheel on the line 3—3 of Fig. 1; Fig. 4 is a plan of the hook and securing chain therefor; and Fig. 5 is a side elevation of the hook with its securing chain.

Referring to the drawings, S represents the spokes, T the tire, R the rim, and F the felly of a vehicle wheel as well understood in the art. The hook comprises a U-shaped member or yoke 1 adapted to loosely span the spoke S, the said yoke terminating in hooks 2 bent directly over the arms of the yoke, the face of the yoke on the side of the hooks being provided with flexed springs 3 secured at one end to the body of the yoke, the free ends of the springs engaging the bottom surfaces of the hooks, forming therewith conventional snap-hooks well understood in the art. After the yoke has been passed over a spoke from one side, the hooks are connected by a link chain 4 passed around the opposite side of the spoke, whereby the yoke becomes secured to the spoke, it being understood of course that to couple the chain 4 to the hooks, the terminal links thereof are slipped past the yielding free ends of the springs 3 as well understood in the art. As best shown in Figs. 3 and 4, the yoke embraces the spoke on three sides, the chain 4 spanning the fourth side or that opposite the cross member of the yoke. To secure the anti-skid chain 5 to the wheel, the chain is wrapped around the tire and felly of the wheel, the free ends of the chain being crossed in front of the spoke (Fig. 3), the terminal link *a* at the end of the inner wrap of the chain being anchored to the hook 2 adjacent the outside of the wheel, and the terminal link *b* at the end of the outer wrap of the chain being anchored to the hook 2 adjacent the inside of the wheel as shown in Figs. 3 and 4, the terminal links *a*, *b*, in Fig. 4 being shown in position ready to be attached or anchored to the hooks. With the chain 5 secured in the manner shown and described, and with the yoke 1 resting on the felly, it is apparent that the strain due to the draft on the chain will in the main be on the spoke, the draft on the chain causing the latter to pull the cross member or base of the yoke against the spoke, a portion of the strain being of course imparted to the felly, owing to the more or less diagonal direction in which the pull on the chain 5 is exerted. The securing chain 4 is merely intended to secure the yoke to the spoke, no particular strain being imposed on this chain. In lieu of the chain 4 I may substitute a short length of wire, or cable, or other means for securing the yoke to the spoke, a link chain not being absolutely necessary. I do not wish to be limited to a yoke of the precise shape as shown, any other form of yoke or anchor capable of spanning a spoke falling within the spirit of my invention. In fact, any member constructed to envelope the spoke and to which the ends of the anti-skid chain 5 may be anchored in substantially the manner here shown and described would fall within the spirit of my invention as set forth in the accompanying claim. As well understood in the art, many vehicle wheels have no felly, the rim being secured directly to the spokes. In that event the yoke would be supported by the rim instead of by the felly as shown in the type of wheel illustrated in the drawings.

Having described my invention what I claim is:

In combination with a spoked vehicle-wheel provided with a tire, a U-shaped yoke passed over a spoke and spanning the same on three sides and resting against the felly of the wheel, snap-hooks terminating the arms of the yoke, a link chain spanning the remaining side of the spoke and having its end links coupled to the respective terminal hooks of the yoke, an anti-skid chain wrapped about the tire and felly, the terminal link of the outer wrap of the chain being secured to the hook facing the inside of the wheel, and the terminal link of the inner wrap of the chain being secured to the hook facing the outside of the wheel.

In testimony whereof I affix my signature, in presence of two witnesses.

VALENTINE C. KLOEPPER.

Witnesses:
EMIL STAREK,
ELSE M. SIEGEL.